US012699564B2

(12) United States Patent
Vrabel

(10) Patent No.: US 12,699,564 B2
(45) Date of Patent: Aug. 4, 2026

(54) SEGMENT LOAD AND STORES

(71) Applicant: Imagination Technologies Limited, Kings Langley (GB)

(72) Inventor: Peter Vrabel, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 17 days.

(21) Appl. No.: 19/017,172

(22) Filed: Jan. 10, 2025

(65) Prior Publication Data

US 2025/0321740 A1      Oct. 16, 2025

(30) Foreign Application Priority Data

Jan. 10, 2024    (GB) ..................................... 2400326

(51) Int. Cl.
G06F 9/30 (2018.01)
(52) U.S. Cl.
CPC ...... G06F 9/30036 (2013.01); G06F 9/30032 (2013.01); G06F 9/30043 (2013.01); G06F 9/30109 (2013.01)
(58) Field of Classification Search
CPC ............. G06F 9/30036; G06F 9/30032; G06F 9/30043; G06F 9/30109
See application file for complete search history.

(56) References Cited

U.S. PATENT DOCUMENTS

| | | | |
|---|---|---|---|
| 8,200,948 B2 * | 6/2012 | Kershaw | ............... G06F 9/3013 |
| | | | 712/222 |
| 10,191,740 B2 * | 1/2019 | Plotnikov | ........... G06F 9/30196 |
| 2004/0054879 A1 | 3/2004 | Macy et al. | |
| 2005/0125647 A1 * | 6/2005 | Symes | .................... G06F 7/768 |
| | | | 712/300 |
| 2011/0153983 A1 * | 6/2011 | Hughes | ............... G06F 9/30032 |
| | | | 711/E12.017 |
| 2019/0042245 A1 | 2/2019 | Toll et al. | |
| 2019/0227798 A1 | 7/2019 | Plotnikov et al. | |
| 2019/0250914 A1 | 8/2019 | Grocutt | |

* cited by examiner

*Primary Examiner* — Corey S Faherty
(74) *Attorney, Agent, or Firm* — Potomac Law Group, PLLC; Vincent M DeLuca

(57) ABSTRACT

Segment load operations are performed by processing data through an anything-to-anything mux, and sections writing elements to respective storage locations based on corresponding indices of the elements and the storage locations. Once all of the elements are loaded into the correct storage location, each location is read again with the elements of that storage location being sent through the mux, arranged) into the correct order, and written back to the same register.

20 Claims, 3 Drawing Sheets

SEGMENT LOAD AND STORES

CROSS-REFERENCE TO RELATED APPLICATIONS AND CLAIM OF PRIORITY

This application claims foreign priority under 35 U.S.C. 119 from United Kingdom patent application No. GB2400326.1 filed on 10 Jan. 2024, the contents of which are incorporated by reference herein in their entirety.

TECHNICAL FIELD

The present disclosure relates to the processing of segment load and store instructions by a processing system.

BACKGROUND

Data that is made up of different types (e.g. real and imaginary numbers) is typically stored in memory as alternating (or interleaving) patterns of different data type (e.g. first real number, first imaginary number, second real number, second imaginary number, and so on). As another example, red-green-blue (RBG) pixel data might be stored as red-green-blue values of a first pixel, red-green-blue values of a second value, and so on. Whilst this is a convenient way of storing the data in memory, it is not convenient for operating on the data. To operate on the data it is more convenient to have all data of the same type in the same register. In other words, it is preferable to have values representing the same type of data in the same register, or put another way, to have the values in a given register representing the same type of data. Using the example above, it would be convenient to have all of the real numbers in the same register to be operated on and all of the imaginary numbers in the same register to be operated on.

One existing method to load the same type of data into same register (known as a "segment load" or "interleaved load") involves loading one element of data at a time into the correct register. This is slow and inefficient. Another method uses dedicated logic to load all data into memory, shuffle the data as required, and then write the data to the correct registers, one data type per register. This is costly from an area perspective.

The reverse is also true. That is, whilst it is preferable to have data of the same type stored in the same register when operating on the data, it is more convenient to store data relating to the same segment (e.g. data point) together. Existing methods for storing data in memory as interleaving data types (known as a "segment store" or "interleaved store") are slow and inefficient, or use dedicated logic, which is costly from an area perspective.

SUMMARY

This Summary is provided merely to illustrate some of the concepts disclosed herein and possible implementations thereof. Not everything recited in the Summary section is necessarily intended to be limiting on the scope of the disclosure. Rather, the scope of the present disclosure is limited only by the claims.

Embodiments of the present invention achieve the desired result of loading segmented data by using a byte-wise anything-to-anything mux (i.e. multiplexer, already present in the central processing unit (CPU)) to first write data of the same type to the same register, and then again to ensure that the data is held in the register in the correct order. This is faster than loading one element at a time, and cheaper from an area perspective as it does not require instantiating any extra, dedicated logic.

Embodiments of the present invention also use a byte-wise anything-to-anything mux to achieve the desired result of storing segmented data. Each source register contains data of a single type. Using the mux, the data is written to temporary storage, such that each register in the temporary storage holds the data that will be written to an associated section of memory, but in the wrong order. The data is then permutated into the correct order, and written to suitable memory. Again, this has area and speed benefits.

According to one aspect disclosed herein, there is provided a computer-implemented method of loading data from memory into register-based storage of a processing system. The data is stored in the memory as interleaved elements, each element belonging to one of a plurality of segments, each element representing a respective data type. Each element is associated with a respective element index based on the respective data type of the respective element and a respective position based on an ordering of the data. The register-based storage comprises a plurality of result entries, wherein each result entry is associated with a respective entry index, each entry having a same size. The processing system comprises a byte-wise anything-to-anything mux and a load entry for temporarily storing data. The method comprises, for each of a plurality of respective data subsets of the data, each data subset being the same size as the entries and comprising one or more elements: loading the respective data subset from memory into the load entry; inputting each element of the respective data subset into the mux; and outputting each element of the respective data subset to a respective result entry having a respective entry index corresponding to a respective element index of the respective element. Each element is output to a respective available slot of the respective result entry, wherein said outputting results in each result entry comprising elements having a same respective element index. The method further comprises, for each result entry, inputting each element stored in the respective result entry into the mux; and outputting each element to the respective result entry at a respective slot of the respective result entry based on the respective position of the respective element.

In embodiments, the steps of loading, inputting and outputting for each data subset may be performed one data subset at a time.

In embodiments, the method may comprise, for each data subset following an initial data subset, determining the respective available slot of the respective result entry based on the respective slots to which the respective elements of a previous respective data subset are output.

In embodiments, said inputting and outputting for each result entry may be processed one result entry at a time.

In embodiments, the method may comprise outputting the elements stored in each result entry to a register file.

According to another aspect disclosed herein, there is provided a computer-implemented method of storing data into memory from register-based storage of a processing system. The data is to be stored in the memory as interleaved elements, each element belonging to one of a plurality of segments, each element representing a respective data type. Each element is associated with a respective segment index based on the respective segment to which the respective element belongs, and a respective position based on an ordering of the data. The register-based storage comprises a plurality of result entries and a plurality of source registers, wherein each result entry is associated with a respective entry index, each entry having a same size. Each source register comprises a plurality of respective elements each associated with a same respective element index and ordered based on the respective position of the respective element. The processing system comprises a byte-wise anything-to-anything mux. The method comprises, for each source register: inputting each element of the respective source register into the mux; and outputting each element of the respective source register to a respective result entry having a respective entry index corresponding to a respective segment index of the respective element, wherein each element is output to a respective available slot of the respective result entry, and wherein said outputting results in each result entry comprising elements having a same respective segment index. The method further comprises, for each result entry: inputting each element stored in the respective result entry into the mux; and outputting each element to the respective result entry at a respective slot of the respective result entry based on the respective position of the respective element.

In embodiments, the steps of inputting and outputting for each source register is performed one source register at a time.

In embodiments, the method may comprise, for each data source register following an initial source register, determining the respective available slot of the respective result entry based on the respective slots to which the respective elements of a previous respective source register are output.

In embodiments, the steps of inputting and outputting for each result entry may be processed one result entry at a time.

In embodiments, the method may comprise outputting the elements stored in each result entry to the memory.

Segment load/stores (also known as interleaving stores, or de-interleaving loads) read in contiguous blocks of memory, with sequential elements being written to the same element index of different registers. This has previously been implemented with logic specific to these instructions. Embodiments of the present disclosure provide a way of executing them efficiently without dedicated logic.

According to some embodiments of the present disclosure, the CPU loads a sequential block of data stored in memory into storage (referred to herein as a load entry in a register-based storage, such as a result cache). The data is then read out through a byte-wise anything-to-anything mux, and sections of the result are written to respective storage locations (referred to herein as result entries in register-based storage). Once all of the data is loaded, this results in the correct data being in each storage location, but not necessarily in the correct order, and in almost all cases at least some of the data will be in the wrong order. To address this, each location is read again, sent through the mux, muxed (i.e. re-arranged) into the correct order, and written to the correct register.

Embodiments of the present disclosure use the same procedure, in reverse, to store data from source registers into memory, where in memory the data is stored as alternating/ interleaving patterns. The CPU reads data from source registers out through a byte-wise anything-to-anything mux to temporary storage locations, with sections of the data being written to respective storage locations. For each storage location, the data output to that storage location is data to be stored in a contiguous region of memory (e.g. data relating to the same complex number or pixel), but not necessarily in the correct order. To deal with this, each storage location is read again, sent through the mux, and muxed (i.e. re-arranged) into the correct order in the same storage location. The data from each storage location can then be written to memory.

According to another aspect disclosed herein, there is provided a processing system comprising memory, register-based storage, a byte-wise anything-to-anything mux, and a load entry for temporarily storing data, the register-based storage comprises a plurality of result entries, wherein each result entry is associated with a respective entry index, each entry having a same size. The processing system is configured to load data from memory into the register-based storage. The data is stored in the memory as interleaved elements, each element belonging to one of a plurality of segments, each element representing a respective data type. Each element is associated with a respective element index based on the respective data type of the respective element, and a respective position based on an ordering of the data. The processing system is configured to, for each of a plurality of respective data subsets of the data, each data subset being the same size as the entries and comprising one or more elements: load the respective data subset from memory into the load entry; input each element of the respective data subset into the mux; and output each element of the respective data subset to a respective result entry having a respective entry index corresponding to a respective element index of the respective element. Each element is output to a respective available slot of the respective result entry, wherein said outputting results in each result entry comprising elements having a same respective element index. The processing system is further configured to, for each result entry: input each element stored in the respective result entry into the mux; and output each element to the respective result entry at a respective slot of the respective result entry based on the respective position of the respective element.

According to another aspect disclosed herein, there is provided a processing system comprising memory, register-based storage and a byte-wise anything-to-anything mux. The register-based storage comprises a plurality of result entries and a plurality of source registers, wherein each result entry is associated with a respective entry index, each entry having a same size. The processing system is configured to store data to memory from the register-based storage, wherein the data is to be stored in the memory as interleaved elements, each element belonging to one of a plurality of segments, each element representing a respective data type. Each element is associated with a respective segment index based on the respective segment to which the respective element belongs, and a respective position based on an ordering of the data. The processing system is configured to, for each source register: input each element of the respective source register into the mux; and output each element of the respective source register to a respective result entry having a respective entry index corresponding to a respective segment index of the respective element, wherein each element is output to a respective available slot of the respective result entry, and wherein said outputting results in each result entry comprising elements having a same respective segment index. The processing system is further configured to, for each result entry: input each element stored in the respective result entry into the mux; and output each element to the respective result entry at a respective slot of the respective result entry based on the respective position of the respective element.

The processing system may be embodied in hardware on an integrated circuit. There may be provided a method of manufacturing, at an integrated circuit manufacturing system, a processing system. There may be provided an integrated circuit definition dataset that, when processed in an integrated circuit manufacturing system, configures the system to manufacture a processing system. There may be provided a non-transitory computer readable storage medium having stored thereon a computer readable description of a processing system that, when processed in an integrated circuit manufacturing system, causes the integrated circuit manufacturing system to manufacture an integrated circuit embodying a processing system.

There may be provided an integrated circuit manufacturing system comprising: a non-transitory computer readable storage medium having stored thereon a computer readable description of the processing system; a layout processing system configured to process the computer readable description so as to generate a circuit layout description of an integrated circuit embodying the processing system; and an integrated circuit generation system configured to manufacture the processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
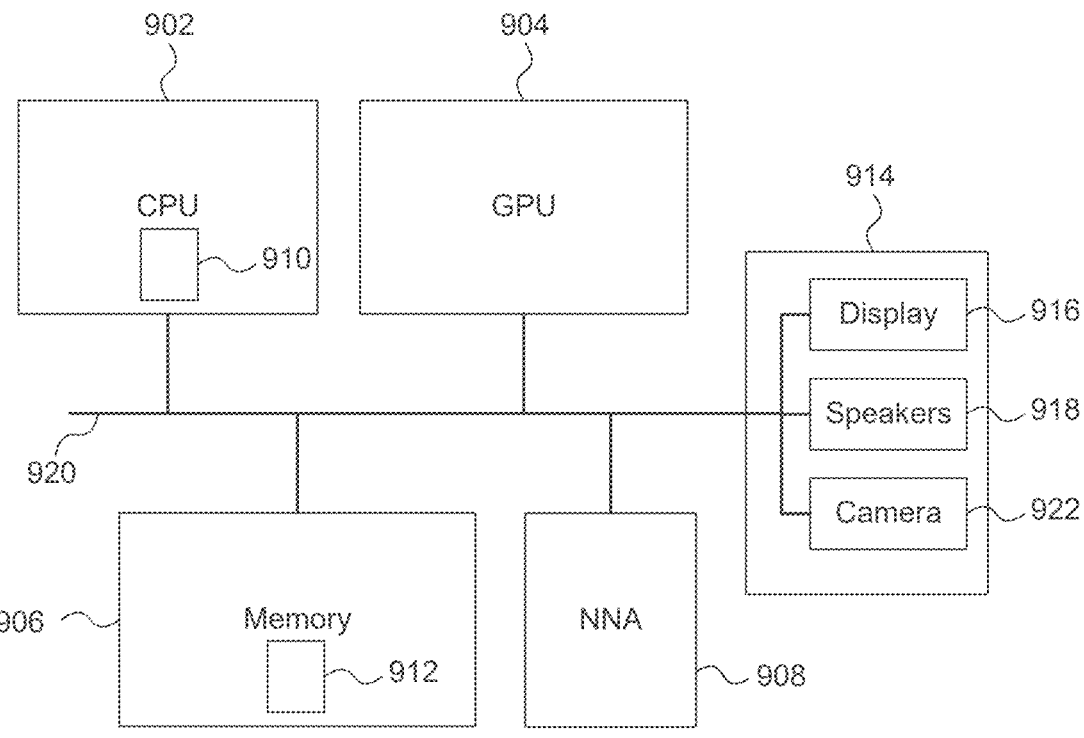
FIG. 1 shows a computer system in which a graphics processing system is implemented.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Figure 3:
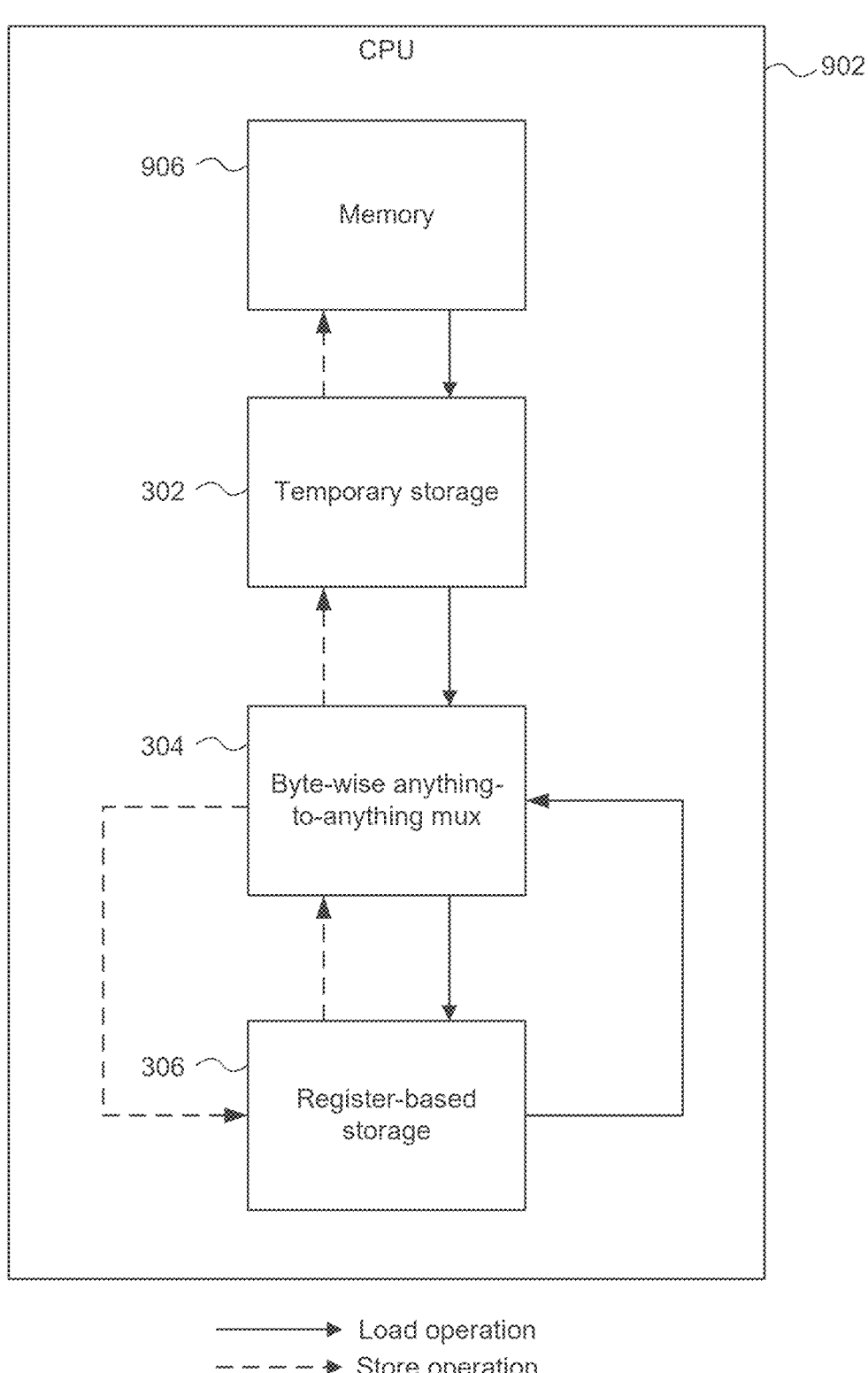
FIG. 3 shows an example processing system for performing segment load and store instructions, where solid-line arrows show the flow of data for a load instruction and dashed-line arrows show the flow of data for a store instruction.

Embodiments disclosed herein relate to the loading and storing of interleaving data, i.e. the execution of load and store operations by a processing system. FIG. 3 illustrates an example configuration of components of a processing system for performing said operations. In this example, the CPU 902 comprises memory 906, temporary storage 302, a byte-wise anything-to-anything mux 304, and a register-based storage system 306. The components may be connected to each other directly, as shown in FIG. 3. Alternatively, there may be one or more additional components between one or more of the components, e.g. between the memory 906 and the temporary storage 302. It should be appreciated that this is merely one example configuration and that other configurations and arrangements are possible. For example, the memory 906, and storage 302, 306 are shown as part of the CPU 902 in FIG. 3, but any or all may be sperate from the CPU 902. For instance, the memory 902 may be connected to the CPU 902 as shown in the example processing system of FIG. 1.

The byte-wise anything-to-anything mux 304 has a plurality of inputs and a plurality of outputs. Each input and output is configured to accept (i.e. hold, store, etc.) one byte of data. Each input and output may be associated with a respective position, i.e. each input has an input position and each output has an output position. The mux 304 may be configured to accept data directly from the temporary storage 302 (e.g. as shown in FIG. 3), or from an intermediate source, i.e. storage between the temporary storage 302 and the mux 304. The mux 304 may be configured to output data directly to the register-based storage 306, or to an intermediate source, i.e. storage between the mux 304 and the register-based storage 306. In some examples, the mux 304 may include temporary storage inside the mux 304. This may be required in order to meet timing constraints. The mux 304 is also configured to accept data from the register-based storage 306, either directly or indirectly. The mux 304 is configured to output any of the input data bytes at any output of the mux 304, e.g. the data at the first input of the mux 304 may be output at any output (e.g. the second or third output) of the mux 304. A bytewise anything-to-anything mux 304 is used since the elements are a whole-number of bytes long. This means that it is only the byte-position of each byte that needs to be changed. Therefore a bit-wise mux is not required.

The register-based storage 306 comprises a number of registers. The register-based storage 306 is configured to receive data output from the mux 304. The data may be results of operations which are completed but not yet ready to be written to a register file. The register-based storage 306 is also referred to herein as a results cache. Each register of the register-based storage 306 may be referred to as a "result entry", i.e. an entry in the register-based storage 306 for storing results. Each result entry is associated with an entry index. The temporary storage 302 may also take the form of a register. The temporary storge 302 is also referred to herein as a "load entry", i.e. an entry in the temporary storage 302 for loading data. Whilst shown separately in FIG. 3, the temporary storge 302 may be part of the register-based storage 306.

The execution of load operations will now be described. As discussed above, the memory 906 stores data in interleaving form. That is, data of different types is stored interleaved one after the other (e.g. first instance of data type A, first instance of data type B, first instance of data type C, second instance of data type A, second instance of data type B, second instance of data type C, third instance of data type A, and so on), as opposed to all data of the same type being stored together (e.g. first instance of data type A, second instance of data type A, third instance of data type A, first instance of data type B, second instance of data type B, third instance of data type B, first instance of data type C, second instance of data type C, third instance of data type C, and so on). As an example, the data may represent complex numbers, where each complex number is represented using two values or parts-a real value and an imaginary value. The memory 906 stores the values relating to given data item together, i.e. the real value and imaginary value representing a complex number are stored one after the other. As another example, the data may represent pixels, where each pixel is represented using four values or components-one for each of red, green, blue and alpha. The memory 906 stores the values relating to a given pixel together.

The values relating to the same data item (e.g. complex number, pixel, etc.) are referred to as a segment. Each segment comprises a number of elements (i.e. a number of bits), with each element representing one of the values. Each element is associated with an element index. Elements representing the same type of value/type of data are associated with the same element index. The desired result of the load operation is to have elements representing the same type of value/data loaded into the same register, in the correct order.

Put simply, each segment has multiple elements, and elements of the same type (from different segments) are interleaved with other elements of different data types.

Each result entry has a specified length, e.g. in bits. The output of the mux 304 has the same length as the result entries. In RISC V, the value that specifies the length of the entries (e.g. vector registers) is referred to as the vector length (VLEN).

When processing a load operation/load instruction, the CPU 902 is configured to cause a first subset (i.e. component, part, chunk, length, etc), of the data (or a zeroth "data subset") to be loaded from memory 906 into the load entry 302. Each data subset has a size equal to the length of the result entry. Using the terminology of RISC V, each data subset is a VLEN of data. Each segment may be smaller than the length of the result entry, the same size as the length of the result entry, or larger than the length of the result entry.

The CPU 902 then causes each element of the first data subset to be input from the load entry 302 to the mux 304. Each element is input to a respective input of the mux 304. The mux 304 is configured to output each element to a result entry having an index matching the index associated with the element. In other words, an element associated with index 0 is output to a result entry associated with index 0, an element associated with index 1 is output to a result entry associated with index 1, an element associated with index 2 is output to a result entry associated with index 2, and so on. The mux 304 is further configured to output each element to an available (i.e. free/empty) position (i.e. slot/location) in the result entry. This may require the elements to be rearranged by the mux such that elements are output at different positions from the input positions. The process is then repeated for each remaining data subset, in turn. That is, a first n bits of the data is processed, then the next n bits of the data, then the next n bits of the data, and so on, until all of the data has been processed, and where n is the size of the result entries. Once each data subset has been loaded to the mux 304 via the load entry 302 and the elements of those data subsets output to respective result entries 306, each result entry will contain elements of only one value/data type. The process is then repeated for each remaining result entry, in turn.

However, at least some of the elements in at least some of the result entries will be in the wrong order, e.g. the second instance of data type B may be positioned before the first instance of data type B. In order to arrange the elements in the correct order, the elements from each result entry are sent through the mux again and re-arranged into the correct order. Starting with the first result entry (or the zeroth result entry), the elements held in the first result entry are input to the mux 304. Each element is associated with a position in a sequence, or alternatively, with a respective data item. In other words, an element will be associated with a particular data item, where that data item has a particular position in a sequence of data items. The mux 304 is configured to output the elements to the same result entry (the first result entry) in an order based on the respective positions or data items associated with the elements, starting with the element associated with an initial position or data item, e.g. the first instance of data type A, followed by the second instance of data type A, followed by the third instance of data type A, and so on. This results in each result entry having elements of the same type, with those elements being in the correct order. The elements may be output to a register file from the result entries to be operated on according to one or more instructions processed by the CPU 902.

The flow of data between components of the system during a load instruction/operation is shown with solid-line arrows in FIG. 3.

The following provides specific examples of loading segmented data. The following definitions are used: VLEN=Length of register in bits, SEW=Length of elements in bits, Segments: Number of registers, RCX: Results Cache entry X (Temporary storage), RC-L: An additional results cache entry for load data, VX: Vector file entry X, VMU: Output of the permutation logic (Vector Mux Unit), "x": Value not relevant.

In a first example, VLEN=32, SEW=8, Segments=4

---

Initial memory (Bytes, Lowest address first):
['0A', '1A', '2A', '3A', '0B', '1B', '2B', '3B', '0C', '1C', '2C', '3C', '0D', '1D', '2D', '3D']
Desired result:
reg0: 0A_0B_0C_0D
reg1: 1A_1B_1C_1D
reg2: 2A_2B_2C_2D
reg3: 3A_3B_3C_3D

| Cycle | RC0/V0 | RC1/V1 | RC2/V2 | RC3/V3 | RC-L | VMU |
|---|---|---|---|---|---|---|
| Loading data | | | | | | |
| 0 | xxxxxxxx | xxxxxxxx | xxxxxxxx | xxxxxxxx | 0A1A2A3A | 0A1A2A3A |
| | FF | FF | FF | FF | <- Which RC bytes are updated | |
| 1 | 0Axxxxxx | xx1Axxxx | xxxx2Axx | xxxxxx3A | 0B1B2B3B | 3B0B1B2B |
| | FF | FF | FF | FF | | |
| 2 | 0A0Bxxxx | xx1A1Bxx | xxxx2A2B | 3Bxxxx3A | 0C1C2C3C | 2C3C0C1C |
| | FF | FF | FF | FF | | |
| 3 | 0A0B0Cxx | xx1A1B1C | 2Cxx2A2B | 3B3Cxx3A | 0D1D2D3D | 1D2D3D0D |
| | FF | FF | FF | FF | | |

-continued

| | RC0/V0 | RC1/V1 | RC2/V2 | RC3/V3 | RC-L | VMU |
|---|---|---|---|---|---|---|
| 4 | 0A0B0C0D | 1D1A1B1C | 2C2D2A2B | 3B3C3D3A | xxxxxxxx | 0A0B0C0D |
| | Fixup permutation - Updating register file FFFFFFFF | | | | | |
| 5 | 0A0B0C0D | xxxxxxxx FFFFFFFF | xxxxxxxx | xxxxxxxx | xxxxxxxx | 1A1B1C1D |
| 6 | 0A0B0C0D | 1A1B1C1D | xxxxxxxx FFFFFFFF | xxxxxxxx | xxxxxxxx | 2A2B2C2D |
| 7 | 0A0B0C0D | 1A1B1C1D | 2A2B2C2D | xxxxxxxx FFFFFFFF | xxxxxxxx | 3A3B3C3D |
| 8 | 0A0B0C0D | 1A1B1C1D | 2A2B2C2D | 3A3B3C3D | xxxxxxxx | xxxxxxxx |

Note that the values are reset to 'xxxx . . .' in line 5 when switching from the result cache entries to the vector file entries. Hence, the notation RCX/VX refers to Result Cache entries in lines 1 to 4, and to Vector file entries in lines 5 to 8.

In a second example, VLEN=32, SEW=16, Segments=2

Initial memory (Bytes, Lowest address first):
['0A', '0B', '1A', '1B', '0C', '0D', '1C', '1D']
Desired result:
reg0: 0A__0B__0C__0D
reg1: 1A__1B__1C__1D

| Cycle | RC0/V0 | RC1/V1 | RC-L | VMU |
|---|---|---|---|---|
| 0 | xxxxxxxx FFFF | xxxxxxxx FFFF | 0A0B1A1B | 0A0B1A1B |
| 1 | 0A0Bxxxx FFFF | xxxx1A1B FFFF | 0C0D1C1D | 1C1D0C0D |
| 2 | 0A0B0C0D | 1C1D1A1B | xxxxxxxx | 0A0B0C0D |
| | Fixup permutation - Updating register file FFFFFFFF | | | |
| 3 | 0A0B0C0D | xxxxxxxx FFFFFFFF | xxxxxxxx | 1A1B1C1D |
| 4 | 0A0B0C0D | 1A1B1C1D | xxxxxxxx | xxxxxxxx |

In a third example, VLEN=32, SEW=8, Segments=3

Initial memory (Bytes, Lowest address first):
['0A', '1A', '2A', '0B', '1B', '2B', '0C', '1C', '20', '0D', '1D', '2D']
Desired result:
reg0: 0A__0B__0C__0D
reg1: 1A__1B__1C__1D
reg2: 2A__2B__2C__2D

| Cycle | RC0/V0 | RC1/V1 | RC1/V1 | RC-L | VMU |
|---|---|---|---|---|---|
| 0 | xxxxxxxx FF FF | xxxxxxxx FF | xxxxxxxx FF | 0A1A2A0B | 0A1A2A0B |
| 1 | 0Axxxx0B FF | xx1Axxxx FF FF | xxxx2Axx FF | 1B2B0C1C | 1B2B0C1C |
| 2 | 0Axx0C0B FF | 1B1Axx1C FF | xx2B2Axx FF FF | 2C0D1D2D | 2C0D1D2D |
| 3 | 0A0D0C0B | 1B1A1D1C | 2C2B2A2D | xxxxxxxx | 0A0B0C0D |
| | Fixup permutation - Updating register file FFFFFFFF | | | | |
| 4 | 0A0B0C0D | xxxxxxxx FFFFFFFF | xxxxxxxx | xxxxxxxx | 1A1B1C1D |
| 5 | 0A0D0C0B | 1A1B1C1D | xxxxxxxx FFFFFFFF | xxxxxxxx | 2A2B2C2D |
| 6 | 0A0D0C0B | 1A1B1C1D | 2A2B2C2D | xxxxxxxx | xxxxxxxx |

The CPU 902 may be configured to execute segmented load operations by performing the following algorithm. For a segmented load with S segments, the load permutation scheme works by performing S loads of size VLEN to one result cache (RC) entry.

Once the first VLEN of load data is in the load entry (i.e. RC-L), send that data through the VMU (Vector Mux unit) so that we:

Write the first element to element 0 of RC0.

Write the second element to element 1 of RC1.

Each subsequent element writes to the next element of the next register.

Wrapping around to the first element if the next element would be beyond VLEN.

Wrapping around to RC0 if the next write would be to RC<S>.

This wrapping can result in element N of the highest RC entry not writing to element N of any RC entry.

If such a write would write to an element that's already been written, write to the next element of that RC entry instead.

Subsequent writes will write the element one higher than that element

For the next VLEN of load data, as above, but:

Start from the RC entry after the last RC entry written by the last lot of load data Start from the element after the last element written by the last lot of load data This results in RC0 to RC<S-1> having the correct data but possibly in the wrong order. To permute the data into the correct format, the scheme is:

Consider each RC entry

Set the extra-steps variable to 0

Consider each destination element

If this is not the first element, increment extra-step if: ((element-number * SEW) modulo VLEN) == 0

The source element of that destination element is given by (element-number + extra-steps + RC-entry-number) modulo (VLEN/SEW)

Note that in some examples the results in RC0 to RC<S-1> may be in the correct order initially, but the data may still be permutated to ensure that this is the case. Alternatively, the algorithm may be optimised to detect the case where the permutation is not required, and in those cases not perform the permutation.

VLEN and SEW are each a power of two, with VLEN being greater than SEW. VLEN will typically be greater than 32 and SEW will typically be greater than 8. Segments is always a positive integer. VLEN may be fixed based on the particular implementation of the processing system. SEW may be set by an earlier instruction processed by the CPU 902. Segments may be specified by the instruction encoding. In general the algorithm may support any method of configuring these variables. Segment stores can be executed by following that procedure in reverse.

When processing a store operation/store instruction, the CPU 902 is configured to cause the data (i.e. elements) held in a source register of register-based storage 306 to be read into the mux 304. Each element held in a given source register relates to the same type of data. Each element is input to a respective input of the mux 304. Each element is associated with a respective segment index representing (i.e. indicating) the segment to which the element relates. The mux 304 is configured to output each element to a result entry having an index matching the segment index associated with the element. In other words, an element associated with index 0 is output to a result entry associated with index 0, an element associated with index 1 is output to a result entry associated with index 1, an element associated with index 2 is output to a result entry associated with index 2, and so on. The mux 304 is further configured to output each element to an available (i.e. free/empty) position (i.e. slot/ location) in the result entry. This may require the elements to be rearranged by the mux such that elements are output at different positions from the input positions. The process is then repeated for each remaining source register, in turn. That is, a first source register is processed, then the next source register, then the next source register, and so on, until each source register has been processed. Once the data from each source register has been loaded to the mux 304 and the elements of those source registers output to respective result entries 306, each result entry will contain elements of only one segment.

However, at least some of the elements in at least some of the result entries will be in the wrong order, e.g. the second element of segment A may be positioned before the first element of segment A. In order to arrange the elements in the correct order, the elements from each entry are sent through the mux again and re-arranged into the correct order. Starting with the first result entry (or the zeroth result entry), the elements held in the first result entry are input to the mux 304. Each element is associated with a position in a sequence, or alternatively, with a respective data item (i.e. segment). In other words, an element will be associated with a particular data item, where that data item has a particular position in a sequence of data items. The mux 304 is configured to output the elements to the same result entry (the first result entry) in an order based on the respective positions associated with the elements, starting with the element associated with an initial position, e.g. the first element of data item A, followed by the second element of data item A, followed by the third element of data item A, and so on. This results in each result entry having elements relating to the same segment, with those elements being in the correct order. The elements may be output to memory 906 from the result entries for storage.

The flow of data between components of the system during a store instruction/operation is shown with dashed-line arrows in FIG. 3. FIG. 3 shows data going via temporary storage 302 when being stored to memory 906 during the store operation. However this is just an illustrative example. In some examples, there may be other temporary storage on the path to saving data in the memory 906 (i.e. not the same temporary storage 302 used during the load operation), or in other implementations the data may be stored directly to memory 906 from the mux 304 without going via any other storage location.

The following provides specific examples of loading segmented data. REGX refers to source register X.

In a first example, VLEN=32, SEW=8, Segments=3. The expected memory contents are ['0A', '1A', '2A', '0B', '1B', '2B', '0C', '1C', '2C', '0D', '1D', '2D']

| Cycle | REG0 0A0B0C0D RC0 | REG1 1A1B1C1D RC1 | REG2 2A2B2C2D RC2 | VMU |
|---|---|---|---|---|
| 0 | XXXXXXXX FF FF | XXXXXXXX FF | XXXXXXXX FF | 0A0D0C0B |
| 1 | 0AXXXX0B FF | XXXX0CXX FF FF | XX0DXXXX FF | 1B1A1D1C |
| 2 | 0A1AXX0B FF | 1BXX0C1C FF | XX0D1DXX FF FF | 2C2B2A2D |
| 3 | 0A1A2A0B | 1B2B0C1C | 2C0D1D2D | 2C2B2A2D |

13 14

In this first example no further permuting is required.

In a second example, VLEN=32 SEW=8, Segments=4. The expected memory contents are '0A', '1A', '2A', '3A', '0B', '1B', '2B', '3B', '0° C.', '1C', '20', '3C', '0D', '1D', '2D', '3D'].

| Cycle | REG0 0A0B0C0D RC0 | REG1 1A1B1C1D RC1 | REG2 2A2B2C2D RC2 | REG3 3A3B3C3D RC3 | VMU |
|---|---|---|---|---|---|
| 0 | XXXXXXXX FF | XXXXXXXX FF | XXXXXXXX FF | XXXXXXXX FF | 0A0B0C0D |
| 1 | 0AXXXXXX FF | XX0BXXXX FF | XXXX0CXX FF | XXXXXX0D FF | 1D1A1B1C |
| 2 | 0A1AXXXX FF | XX0B1BXX FF | XXXX0C1C FF | 1DXXXX0D FF | 2C2D2A2B |
| 3 | 0A1A2AXX FF | XX0B1B2B FF | 2CXX0C1C FF | 1D2DXX0D FF | 3B3C3D3A |
| 4 | 0A1A2A3A | 3B0B1B2B | 2C3C0C1C | 1D2D3D0D | 0A1A2A3A |
| Rotating RC entries: FFFFFFFF | | | | | |
| 4 | 0A1A2A3A | 3B0B1B2B FFFFFFFF | 2C3C0C1C | 1D2D3D0D | 3B0B1B2B |
| 5 | 0A1A2A3A | 0B1B2B3B | 2C3C0C1C FFFFFFFF | 1D2D3D0D | 2C3C0C1C |
| 6 | 0A1A2A3A | 0B1B2B3B | 0C1C2C3C | 1D2D3D0D FFFFFFFF | 1D2D3D0D |
| 7 | 0A1A2A3A | 0B1B2B3B | 0C1C2C3C | 0D1D2D3D | XXXXXXXX |

The CPU 902 may be configured to execute segmented store operations by performing the following algorithm. For each source register: read that register, send that data through the mux unit, write chunks of that output to different RC entries. That results in the RC entries storing the correct data, but possibly in the wrong order. For each RC entry that needs to be re-ordered, read that entry, send it through the MUX unit, write the output back to that entry. For each RC entry: store that data to memory.

More specifically, in a first muxing round algorithm, let:

```
seg = number of segments
sewb = element width in bytes
vlene = vector length in elements
vlenb = vector length in bytes
r = current source register number
e = current element index
b = current byte index in the current element
% means modulo
// means divide and round down to nearest integer
For each source register:
    extra_steps = 0
    for each element in the register:
        for each byte in the element:
            target_element = ((e*seg) + r + extra_steps) % vlene
            target_byte = (target_element * sewb) + b
        target_reg = ((e*seg) + r) // vlene
        if this target_byte is the same as an earlier byte from this source register:
            extra_steps = extra_steps + 1
            target_byte = (target_byte + sewb) % vlenb
        The data of byte b of element e of register r should be:
            output on the mux at position target_byte
            written to RC entry target_reg
In a second muxing round algorithm:
    for each RC entry:
        rotate_increment_period = lowest_common_multiple((seg * sewb), vlenb) // vlenb
        rotate_distance = (rc_entry_number // rotate_increment_period) * sewb
        This RC entry should be rotated left by an amount of bytes equal to rotate_distance.
```

FIG. 1 shows a computer system in which processing systems described herein may be implemented. The computer system comprises a CPU 902, a GPU 904, a memory 906, a neural network accelerator (NNA) 908 and other devices 914, such as a display 916, speakers 918 and a camera 922. A processing block 910 (corresponding to processing blocks 110) is implemented on the CPU 902. In other examples, one or more of the depicted components may be omitted from the system, and/or the processing block 910 may be implemented on the GPU 904 or within the NNA 908. The components of the computer system can communicate with each other via a communications bus 920. A store 912 (corresponding to store 112) is implemented as part of the memory 906.

Figure 2:
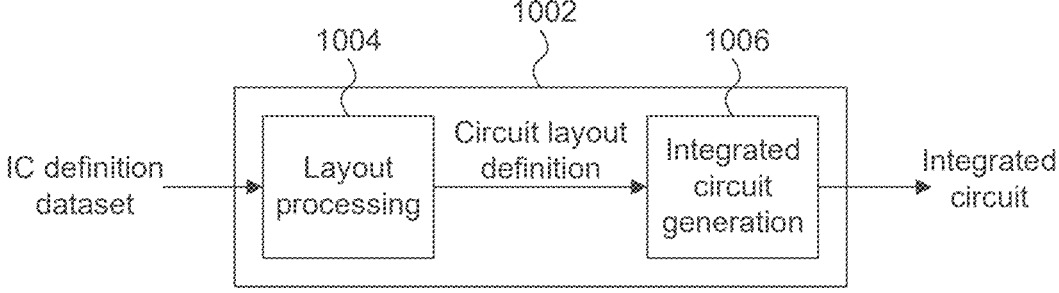
FIG. 2 shows an integrated circuit manufacturing system for generating an integrated circuit embodying a graphics processing system.

The processing system of FIGS. 1-3 are shown as comprising a number of functional blocks. This is schematic only and is not intended to define a strict division between different logic elements of such entities. Each functional block may be provided in any suitable manner. It is to be understood that intermediate values described herein as being formed by a processing system need not be physically generated by the processing system at any point and may merely represent logical values which conveniently describe the processing performed by the processing system between its input and output.

The processing system described herein may be embodied in hardware on an integrated circuit. The processing system described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a processing system configured to perform any of the methods described herein, or to manufacture a processing system comprising any apparatus described herein. An integrated circuit definition dataset may be, for example, an integrated circuit description.

Therefore, there may be provided a method of manufacturing, at an integrated circuit manufacturing system, a processing system as described herein. Furthermore, there may be provided an integrated circuit definition dataset that, when processed in an integrated circuit manufacturing system, causes the method of manufacturing a processing system to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a processing system will now be described with respect to FIG. 2.

FIG. 2 shows an example of an integrated circuit (IC) manufacturing system 1002 which is configured to manufacture a processing system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a processing system as described in any of the examples herein), process the IC definition dataset, and generate an IC according to the IC definition dataset (e.g. which embodies a processing system as described in any of the examples herein). The processing of the IC definition dataset configures the IC manufacturing system 1002 to manufacture an integrated circuit embodying a processing system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 2 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 2, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of loading data from memory into register-based storage of a processing system, wherein the data is stored in the memory as interleaved elements, each element belonging to one of a plurality of segments, each element representing a respective data type, wherein each element is associated with a respective element index based on the respective data type of the respective element, and wherein each element is associated with a respective position based on an ordering of the data, wherein the register-based storage comprises a plurality of result entries, wherein each result entry is associated with a respective entry index, each entry having a same size, and wherein the processing system comprises a byte-wise anything-to-anything mux and a load entry for temporarily storing data, and wherein the method comprises:

for each of a plurality of respective data subsets of the data, each data subset being the same size as the entries and comprising one or more elements:

loading the respective data subset from memory into the load entry;

inputting each element of the respective data subset into the mux; and outputting each element of the respective data subset to a respective result entry having a respective entry index corresponding to a respective element index of the respective element, wherein each element is output to a respective available slot of the respective result entry, wherein said outputting results in each result entry comprising elements having a same respective element index; and for each result entry:

inputting each element stored in the respective result entry into the mux; and outputting each element to the respective result entry at a respective slot of the respective result entry based on the respective position of the respective element.

2. The method of claim 1, wherein said loading, inputting and outputting for each data subset is performed one data subset at a time.

3. The method of claim 2, further comprising:

for each data subset following an initial data subset, determining the respective available slot of the respective result entry based on the respective slots to which the respective elements of a previous respective data subset are output.

4. The method of claim 1, wherein said inputting and outputting for each result entry is processed one result entry at a time.

5. The method of claim 1, further comprising outputting the elements stored in each result entry to a register file.

6. A processing system configured to perform the method as set forth in claim 1.

7. A non-transitory computer readable storage medium having stored thereon computer readable code that, when executed at a computer system, causes the computer system to perform the method as set forth in claim 1.

8. A processing system comprising memory, register-based storage, a byte-wise anything-to-anything mux, and a load entry for temporarily storing data, wherein the register-based storage comprises a plurality of result entries, wherein each result entry is associated with a respective entry index, each entry having a same size, wherein the processing system is configured to load data from memory into the register-based storage, wherein the data is stored in the memory as interleaved elements, each element belonging to one of a plurality of segments, each element representing a respective data type, wherein each element is associated with a respective element index based on the respective data type of the respective element, and wherein each element is associated with a respective position based on an ordering of the data, and wherein the processing system is configured to:

for each of a plurality of respective data subsets of the data, each data subset being the same size as the entries and comprising one or more elements:
load the respective data subset from memory into the load entry;
input each element of the respective data subset into the mux; and
output each element of the respective data subset to a respective result entry having a respective entry index corresponding to a respective element index of the respective element, wherein each element is output to a respective available slot of the respective result entry, wherein said outputting results in each result entry comprising elements having a same respective element index; and
for each result entry:
input each element stored in the respective result entry into the mux; and
output each element to the respective result entry at a respective slot of the respective result entry based on the respective position of the respective element.

9. The processing system of claim 8, wherein the processing system is embodied in hardware on an integrated circuit.

10. A method of manufacturing, using an integrated circuit manufacturing system, a processing system as set forth in claim 9, the method comprising:
processing, using a layout processing system, a computer readable description of the processing system so as to generate a circuit layout description of an integrated circuit embodying the processing system; and
manufacturing, using an integrated circuit generation system, the processing system according to the circuit layout description.

11. A computer-implemented method of storing data into memory from register-based storage of a processing system, wherein the data is to be stored in the memory as interleaved elements, each element belonging to one of a plurality of segments, each element representing a respective data type, wherein each element is associated with a respective segment index based on the respective segment to which the respective element belongs, and wherein each element is associated with a respective position based on an ordering of the data, wherein the register-based storage comprises a plurality of result entries and a plurality of source registers, wherein each result entry is associated with a respective entry index, each entry having a same size, wherein each source register comprises a plurality of respective elements each associated with a same respective element index and ordered based on the respective position of the respective element, wherein the processing system comprises a byte-wise anything-to-anything mux, and wherein the method comprises:

for each source register:
inputting each element of the respective source register into the mux; and
outputting each element of the respective source register to a respective result entry having a respective entry index corresponding to a respective segment index of the respective element, wherein each element is output to a respective available slot of the respective result entry, and wherein said outputting results in each result entry comprising elements having a same respective segment index; and
for each result entry:
inputting each element stored in the respective result entry into the mux; and
outputting each element to the respective result entry at a respective slot of the respective result entry based on the respective position of the respective element.

12. The method of claim 11, wherein said inputting and outputting for each source register is performed one source register at a time.

13. The method of claim 12, further comprising:
for each data source register following an initial source register, determining the respective available slot of the respective result entry based on the respective slots to which the respective elements of a previous respective source register are output.

14. The method of claim 11, wherein said inputting and outputting for each result entry is processed one result entry at a time.

15. The method of claim 11, comprising outputting the elements stored in each result entry to the memory.

16. A processing system configured to perform the method as set forth in claim 11.

17. A non-transitory computer readable storage medium having stored thereon computer readable code that, when executed by a computer system, causes the computer system to perform the method as set forth in claim 11.

18. A processing system comprising memory, register-based storage and a byte-wise anything-to-anything mux, wherein the register-based storage comprises a plurality of result entries and a plurality of source registers, wherein each result entry is associated with a respective entry index, each entry having a same size, wherein the processing system is configured to store data to memory from the register-based storage, wherein the data is to be stored in the memory as interleaved elements, each element belonging to one of a plurality of segments, each element representing a respective data type, wherein each element is associated with a respective segment index based on the respective segment to which the respective element belongs, and wherein each element is associated with a respective position based on an ordering of the data, and wherein the processing system is configured to:

for each source register:
input each element of the respective source register into the mux; and
output each element of the respective source register to a respective result entry having a respective entry index corresponding to a respective segment index of the respective element, wherein each element is output to a respective available slot of the respective result entry, and wherein said outputting results in each result entry comprising elements having a same respective segment index; and for each result entry:

input each element stored in the respective result entry into the mux; and output each element to the respective result entry at a respective slot of the respective result entry based on the respective position of the respective element.

19. The processing system of claim 18, wherein the processing system is embodied in hardware on an integrated circuit.

20. A method of manufacturing, using an integrated circuit manufacturing system, a processing system as set forth in claim 18, the method comprising:

processing, using a layout processing system, a computer readable description of the processing system so as to generate a circuit layout description of an integrated circuit embodying the processing system; and manufacturing, using an integrated circuit generation system, the processing system according to the circuit layout description.

* * * * *